United States Patent
Feldman et al.

[11] Patent Number: 6,008,941
[45] Date of Patent: Dec. 28, 1999

[54] OPTICAL SOFT APERTURE AND USE THEREOF

[75] Inventors: Michael Feldman; Alan D. Kathman; W. Hudson Welch; Robert Te Kolste, all of Charlotte, N.C.

[73] Assignee: Digital Optics Corporation, Charlotte, N.C.

[21] Appl. No.: 08/833,220

[22] Filed: Apr. 14, 1997

Related U.S. Application Data

[63] Continuation-in-part of application No. 08/668,976, Jun. 24, 1996, Pat. No. 5,718,496.

[60] Provisional application No. 60/028,892, Oct. 18, 1996, abandoned.

[51] Int. Cl.$^6$ .................................................. G02B 5/30
[52] U.S. Cl. .......................... 359/565; 359/575; 359/900; 359/888
[58] Field of Search .................................. 359/558, 738, 359/739, 885, 888, 894, 15, 27, 16, 19, 565, 900, 559, 575; 372/103

[56] References Cited

U.S. PATENT DOCUMENTS

| | | | |
|---|---|---|---|
| 4,138,190 | 2/1979 | Bryngdahl | 359/15 |
| 4,355,858 | 10/1982 | Funato et al. | 359/27 |
| 4,469,407 | 9/1984 | Cowan et al. | 359/566 |
| 5,061,025 | 10/1991 | Debesis | 359/569 |
| 5,111,343 | 5/1992 | Harrigan | 359/888 |
| 5,148,317 | 9/1992 | Foresi | 359/566 |
| 5,161,059 | 11/1992 | Swanson et al. | 359/565 |
| 5,237,451 | 8/1993 | Saxe | 359/565 |
| 5,315,427 | 5/1994 | Rauch et al. | 359/569 |
| 5,422,746 | 6/1995 | Aharoni et al. | 359/15 |
| 5,450,148 | 9/1995 | Shu et al. | 353/42 |
| 5,610,733 | 3/1997 | Feldman et al. | 359/15 |

FOREIGN PATENT DOCUMENTS

| | | | |
|---|---|---|---|
| 0348863 | 1/1990 | European Pat. Off. | G02B 5/00 |
| 0429243 | 5/1991 | European Pat. Off. | G02B 5/18 |
| 0615142 | 9/1994 | European Pat. Off. | G02B 5/18 |
| 0704721 | 4/1996 | European Pat. Off. | G02B 5/18 |

OTHER PUBLICATIONS

G. J. Swanson, "Binary Optics Technology: The Theory and Design of Multi–Level Diffractive Optical Elements", Mass. Inst. Techn., Lincoln Laboratory, Technical Report 854, pp. 1–16 8/1989.

*Primary Examiner*—Cassandra Spyrou
*Assistant Examiner*—John Juba, Jr.
*Attorney, Agent, or Firm*—Jones Volentine, LLP

[57] ABSTRACT

A soft aperture allows gradual attenuation of a light beam dependent upon its location away from the center of a diffractive optical element. Such an optical element may be provided by decreasing a number of phase levels, increasing a number of phase levels, increasing a density of metal patches or diffractive gratings, or decreasing a blaze height and/or duty cycle, all radially from the center. Alternatively, the soft aperture may be defined by a photolithographic process. Such a soft aperture is particularly useful in aiding circularizing of an elliptical light beam. The soft aperture may be used alone or integrated with other optical elements.

8 Claims, 8 Drawing Sheets

OPTICAL SOFT APERTURE AND USE THEREOF

CROSS REFERENCES TO RELATED APPLICATIONS

This application claims the benefit of priority under 35 U.S.C. §120 as a Continuation-in-Part of U.S. application Ser. No. 08/668,976 filed Jun. 24, 1996, now U.S. Pat. No. 5,718,496, and under 35 U.S.C. §119(e) to U.S. Provisional application Ser. No. 60/028,892 filed Oct. 18, 1996 now abandoned.

BACKGROUND OF THE INVENTION

1. Field of the Invention

The present invention is directed to using diffractive optics to correct input light beams. In particular, the present invention is directed to diffractive optics which form a soft aperture to aid in circularizing a non-circular input beam as well as integration of the soft aperture diffractive optics with a refractive and/or further diffractive element used to collimate and correct an input beam forming a single element.

2. Description of Related Art

Laser diodes are compact, efficient, inexpensive and capable of mass production. This has lead to an increasing number of applications for which laser diodes are used. However, the active region of the laser diodes is quite small and asymmetric. This results in a small and asymmetric beam waist. Consequently, the beam divergence is severe and asymmetric.

Failure to correct the ellipticity of the beam is sometimes unimportant, but many applications require collimated outputs with low optical aberrations. If the beam is to be collimated for a particular application, the far field beam divergence will be different in the two directions. Thus, the ellipticity of the beam must be corrected by a subsequent optical system. Astigmatism is a further property of laser diodes which presents an additional potential disadvantage in many applications. This astigmatism is also corrected most advantageously by a subsequent optical system.

There have been numerous design solutions for collimating and correcting wavefronts of diode lasers. One such solution includes using conventional cylindrical lenses to collimate each axis independently. However, the performance of such cylindrical lenses is degraded for more asymmetric beams, since skew rays cannot be corrected, and is hard to align.

Another configuration is shown, for example, in U.S. Pat. No. 5,229,883 to Jackson et al. As can be seen in FIGS. 2 and 3 of Jackson et al., a cylindrical lens 22 is used in conjunction with a binary optical element 28. The binary optical element 28 is designed such that each ray of light from the diverging input light source will travel the same optical path length or vary from the optical path length by a discrete multiple of the wavelength of the light traveling from its source to its exit from the front surface of the binary optical element. While the low horizontal divergence may typically be collimated with cylindrical optical elements with few resulting aberrations, collimation of the fast vertical divergence requires optical elements with increased optical power at a much lower f number which generally results in increased optical aberrations with the collimated output.

The cylindrical lens 22 is used to collimate the laser diode's output in the fast axis. Binary optics 28 include a substrate on which a binary optical diffraction pattern is etched. The binary optic diffraction pattern is typically an eight phase level structure which corrects for optical path differences inherent in the divergent light. The binary optical element collimates the slow axis divergence and corrects for skew ray aberration of rays not in either the fast or slow axis. These additional corrections are inherent in a binary optical element whose diffraction pattern is chosen so as to have each optical ray travel in equal optical path lengths or an optical path length that varies from that equal optical path length by integer multiple of the wavelength of light traveling therethrough.

In order to provide proper correction of the beam output from the laser diode 10, the cylindrical lens 22 and the diffractive optical element 28 in the Jackson et al. configuration must be both properly positioned along the optical axis, but also rotationally aligned with one another. This rotation alignment is crucial, since the different axes are treated differently. This rotational alignment can be difficult and sensitive, requiring expensive continuous rotational alignment.

When two elements, both providing optical power, need to be aligned, often active alignment is required. Active alignment is performed by turning on a beam and continuously adjusting the optical elements until a desired beam is achieved. Such active alignment is difficult and expensive. When optical power is provided by both elements, optimal alignment of a single element alone may not provide satisfactory alignment with the other optical element to provide the optimum results for the system as a whole.

SUMMARY OF THE INVENTION

It is an object of the present invention to provide an apodized or soft aperture which reduces ringing caused by hard apertures, improves circularity and may be integrated with other optical elements.

It is a further object of the present invention to provide a means and method of collimating and correcting the shape of a non-circular beam using a single optical element.

It is yet another object of the present invention to provide collimation and correction using optical elements for which active alignment is not required.

These and other objects of the present invention may be achieved by providing a soft aperture which contains attenuates more and more power from a desired output beam as the distance from the center of the element increases. The varying power attenuation as the distance radially increase from the center may be provided in a number of ways, including decreasing a number of phase levels away from the center, increasing a number of phase levels away from the center, increasing a density of scattering portions away from the center, and etchings varying in height and/or duty cycle away from the center. Advantageously, the soft aperture may be integrated with other diffractive optics and/or refractive optics, such as a collimating device, forming an integrated optic and reducing alignment requirements. Preferably, the optic is made of plastic.

These and other objects of the present invention may also be realized by a method for circularizing a laser beam, including providing a maximum power attenuation from a desired output beam at an outer edge of a diffractive optical element, providing a minimum power attenuation from the desired output beam at a center of the diffractive optical element, and passing a laser beam through the diffractive optical element.

Further, these and other objects of the present invention may be realized by providing an apparatus for reducing ellipticity of an elliptical laser beam. This apparatus includes a soft aperture, receiving the elliptical laser beam, providing varying degrees of power attenuation in a desired output beam, with a maximum power attenuation being at an edge of the element and a minimum power attenuation being at the center of the element. The varying degrees of power attenuation reduce the ellipticity of the laser beam.

When used only as a soft aperture, an optical element in accordance with the present invention may include regions having a number of phase levels, a number of phase levels increasing as the region is further removed from a center of the element. The phase levels are constructed such that an increase in the number of phase levels results in an increase, rather than a decrease, in the amount of attenuation.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below in the accompanying drawings which are given by way of illustration only, and thus are not limited to the present invention and wherein:

FIG. 2b illustrates a first embodiment of achieving the schematic configuration as shown in FIG. 2a;

FIG. 2c illustrates a second embodiment of achieving the schematic configuration shown in FIG. 2a;

FIG. 2d illustrates a third embodiment of achieving the configuration shown in FIG. 2a;

FIG. 5a illustrates an intensity profile of a laser beam to be circularized;

FIG. 5b illustrates a soft aperture diffractive optic for use with the beam profile in FIG. 5a;

FIG. 5c illustrates the circularized output after the beam in FIG. 5a has passed through the soft aperture in FIG. 5b;

DETAILED DESCRIPTION OF THE PREFERRED EMBODIMENTS

Figure 1A:
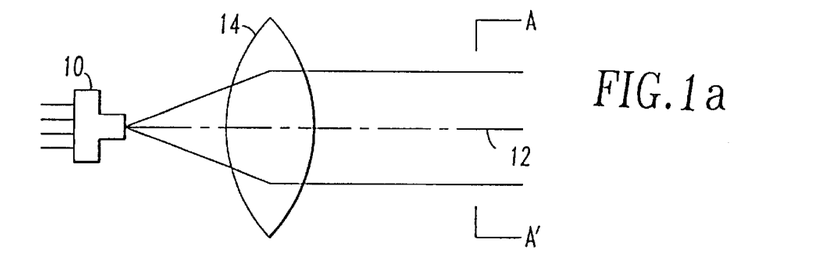
FIG. 1a shows a typical collimating configuration using a single rotationally symmetric lens.
Figure 1B:
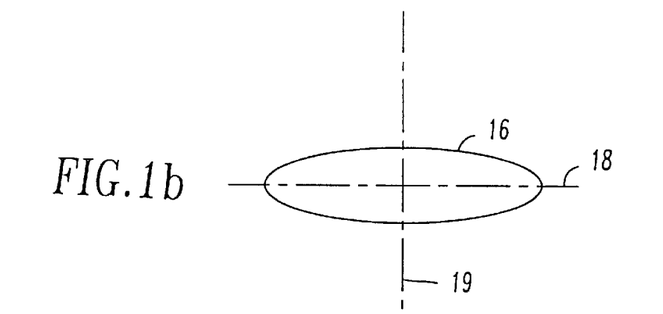
FIG. 1b shows the beam resulting from the configuration in FIG. 1a taken along the line A–A'.

As shown in FIG. 1a, a laser diode 10 outputs a beam along an optical axis 12. The divergence of this beam may be reduced using an optical element 14. However, as can be seen in FIG. 1b, a beam profile 16, even after the optical element 14, is still elliptical. In particular, the beam is longer or more divergent along a fast axis 18, and is shorter or less divergent along a slow axis 19. Conventional configurations used to address this ellipticity were discussed above in the background.

Figure 2A:
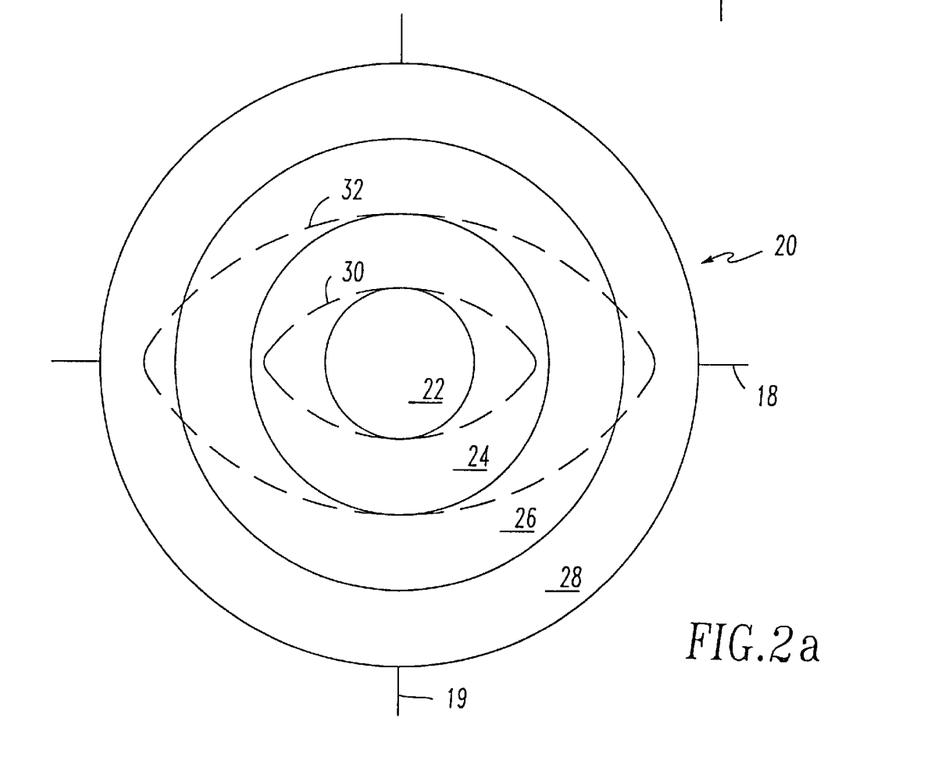
FIG. 2a is a schematic of the diffractive optical element of the present invention.

As can be seen in FIG. 2a, the general concept of the present invention involves providing an optical element 20 which increases power attenuation towards the outer edge thereof. By increasing power attenuation, when used with diffractive embodiments of the present invention, this means a decrease in the amount of power diffracted into a desired diffractive order. Typically, the desired diffractive order will be the first order, but the element 20 may be designed to utilize any order, including zero and orders higher than one. In a diffractive element, typically all of the power in the beam is transmitted therethrough, the diffractive element shaping the beam by directing portions thereof into various diffractive orders. Therefore, in connection with the present invention, the term power attenuation means power reduction in a desired output beam.

In the specific example shown, the optical element 20 includes a binary pattern shown by solid circles, in which the number of phase levels within each circle decreases towards the outer edge thereof. The binary pattern, for example, includes an inner region 22 having eight phase levels, a first intermediate region 24 having four phase levels, a second intermediate region 26 having three phase levels, and an outer region 28 having two phase levels. As the region width approaches the order of a grating period, there will be a continuous decrease in phase levels, in moving from the center of the element to the edge.

For illustration purposes only, the diffractive optical element 20 shown in FIG. 2a is an eight level binary diffractive optic. However, any appropriate number of phase levels, including two, three, four, or sixteen phase levels may be fabricated and utilized as known to those skilled in the art. The phase level coding of the optical element 20 for generating the image is preferably created by using the methods disclosed in the article by Feldman and Guest, "Iterative encoding of high-efficiency holograms for generating spot arrays", OPTICAL LETTERS, 14, 479–81 (1989), hereby incorporated by reference.

The binary optical pattern is etched on the back surface of the binary optical element, i.e., the surface facing away from the beam to be corrected and collimated. This etching is well-known to those skilled in the art. Details of such etching processes may be found, for example, in U.S. Pat. No. 4,847,552 issued to Veldkamp et al., which is herein incorporated by reference. When the substrate is plastic, such etching is taught, for example, in a commonly assigned application Ser. No. 08/381,169 entitled "Molding Diffractive Optical Elements" filed on Jan. 31, 1995, which is hereby incorporated by reference.

The diffractive optical element 20 includes a substrate on which the binary optical pattern is etched. The substrate of the binary optical element 20 may be of any of a variety of materials as well-known to those skilled in the art, suitable materials include plastic and silicon dioxide. The implementation of diffractive optical elements using plastic substrates is especially advantageous. Plastic has the evident advantages of being light weight and inexpensive. However, plastic is also particularly susceptible to thermal variations. In refractive optics, these thermal variations result in a change in the focal length, which results in unacceptable performance. However, for diffractive elements, the change in focal length with temperature is in the opposite direction as that change for refractive elements. As discussed below, this factor may be used to compensate for the thermal changes in plastic refractive optics.

The radially decreasing phase levels as shown in FIG. 2a creates a "soft" aperture. This is in contrast to the hard aperture typically provided by optical elements which provide a sharp boundary outside of which light cannot pass. Such a hard aperture results in Airy disk type patterns or ringing from diffraction. The soft aperture as shown in FIG. 2a attenuates power in the fast axis at a faster rate than the Gaussian beam. The transmission in this soft aperture gradually decreases from one inside the center to zero at the edges. Therefore rather than being an all or nothing type hard aperture, a soft aperture serves to attenuate power as the beam is spread away from the central location.

Specific examples of variations in the number of phase levels can be seen, for example, in FIGS. 7b and 8b, discussed in detail below. As can be seen in these FIG. 7b, when the discrete phase levels face the center of the element, an increase in the number of discrete phase levels which diffract the input light away from the zeroth order will result in the desired power attenuation. In this example in FIG. 7b, the central region 22 has no phase levels, so the input beam is undisturbed. In region 24, the phase element presents one discrete phase level, which diffracts some of the light away from the optical axis. In region 26, the phase element presents two discrete phase levels, increasing the amount of light diffracted away from the optical axis. Finally, the outer region 28 presents three discrete levels and diffracts most of the input light away from the optical axis.

Figure 8A:
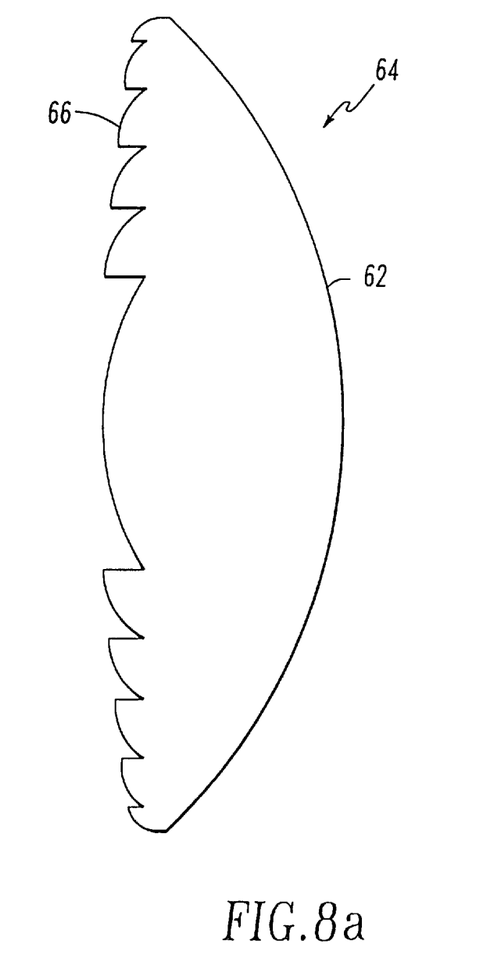
FIG. 8a illustrates a refractive/diffractive hybrid in which the diffractive circularizes and contributes to collimation.
Figure 8B:
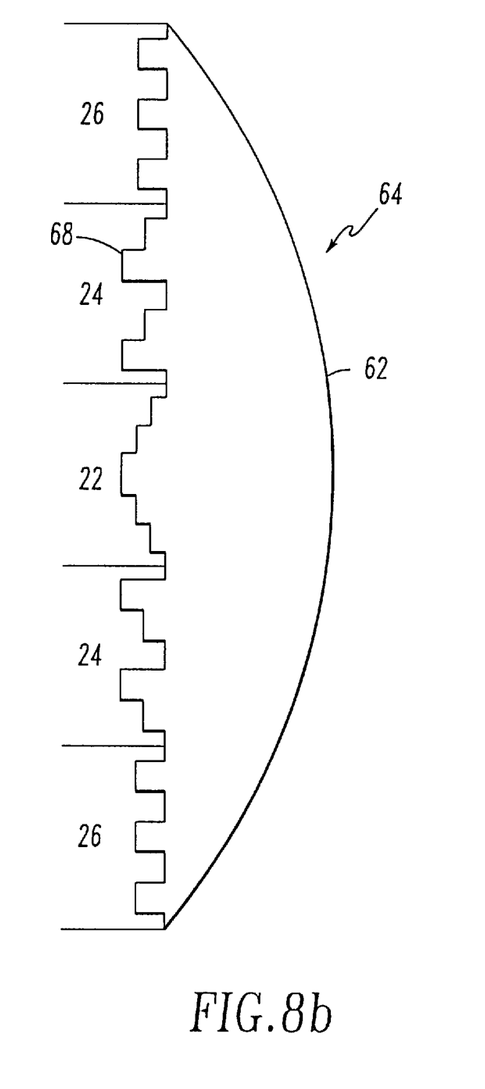
FIG. 8b illustrates another refractive/diffractive hybrid in which the diffractive circularizes and contributes to collimation.

In contrast, as shown in FIG. 8b, when the discrete phase levels face away from the center of the element, a decrease in the number of discrete phase levels which diffract the input light towards the first order will result in the desired power attenuation. In this example, the central region 22 has no three discrete phase levels, so the majority of the input beam is directed into the first order to be utilized. In region 24, the phase element presents two discrete phase levels, which diffracts some of the light into the first order. In region 26, which serves as the outer region in this example, the phase element presents one discrete phase level, further decreasing the amount of light diffracted into the first order.

If the beam is not very divergent, all of it should pass through the inner regions 22, 24 of the element 20 having a large number of phase levels and experience little or no attenuation, as it would along the slow axis. Since the fast axis is more divergent than the slow axis, the fast axis will intercept the outer regions of the element 20 having fewer phase levels.

The path of the beam through the element 20 is illustrated by the dashed ellipses in FIG. 2a. The inner dashed ellipse 30 indicates the half intensity points of the Gaussian beam output by a laser diode, at which point the beam has one-half of the intensity of the peak intensity at the center of the beam. The outer dashed ellipse 32 illustrates the $1/e^2$ points of the Gaussian beam output by the laser diode. The $1/e^2$ point defines the beam radius and is the point at which the intensity of the beam has fallen to 13.5% of the maximum intensity at the center.

The dashed ellipse 30 illustrate that for the region where the intensity of the beam is greater than half of the peak value, i.e., full width at half maximum, the beam along the slow axis 19 will encounter only the inner region 22, while along the fast axis 18, the beam will encounter both the inner 22 and the first 24 intermediate regions. Similarly, the dashed ellipse 32 illustrates that for the region where the intensity of the beam is between 13.5% of the maximum intensity and half of the maximum intensity, the beam along the slow axis will encounter only the first intermediate region 24, while along the fast axis 18, the beam will encounter the second intermediate region 26 and the outer region 28. Thus, the power along the fast axis 18 is more greatly attenuated than the power along the slow axis 19, while not attenuating a region of the beam having the peak intensity.

The Table below provides an estimate as to how much of the beam is attenuated for a particular number of discrete phase levels, when to discrete phase levels are oriented as shown in FIG. 8b. Any number in between the number of phase levels provided in the table may be used, but the most effective to manufacture and produce desired results will typically be levels of a power of two.

TABLE

| No. of phase levels | Theoretical Diffraction Efficiency | Actual Diffraction Efficiency of aperture in FIG. 2a |
| --- | --- | --- |
| 8 | 95% | 80–90% |
| 4 | 80% | 60–70% |
| 2 | 40% | 20–25% |

As can be seen from the Table, an increase in the number of phase levels increases the diffraction efficiency. In the Table, and for the example shown in FIG. 2a, the diffraction efficiency is for a first order output beam. Thus, as the number of phase levels increases, an increasing amount of light is diffracted into the first order beam. For a lower number of phase levels, less power will be diffracted into the desired first order output beam.

In addition to the use of phase levels noted above, a soft aperture in accordance with the present invention may be created in a variety of ways. Some of these configurations also use diffraction for shaping the beam, while others simply scatter away certain portions of light to achieve the soft aperture. In the latter configurations, the desired output beam will not be of any particular diffractive order, since diffraction is not occurring for the soft aperture. Thus, the desired output beam is just the entire beam output beam from the scattering soft aperture, in which power is attenuated across the entire beam.

Figure 2B:
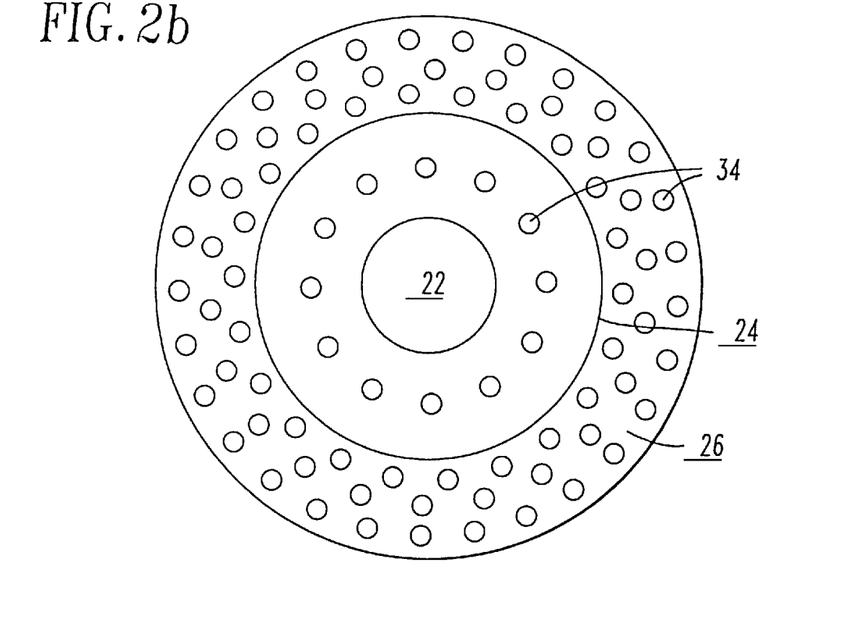

For example, as shown in FIG. 2b, randomly dispersed metal patches 34, preferably of the same size may be placed on the optical element to create the regions 22–26 of increasing beam attenuation in the optical element 20. The desired power attenuation may be accomplished by increasing particle density of the metal patches 34 at radially increasing distances of the soft aperture. As shown in FIG. 2b, the patches may be regularly radially symmetric.

The number of these random metal patches 34 increases, either linearly throughout the element or stepwise in accordance with the regions, as shown in FIG. 2b, towards the outer edge of the element 20. Preferably, the central region 22 having no patches. Alternatively, these metal patches 34 could be portions where diffraction gratings are placed to scatter light. The more of these portions, the more power attenuated in a scattering fashion.

Figure 2C:
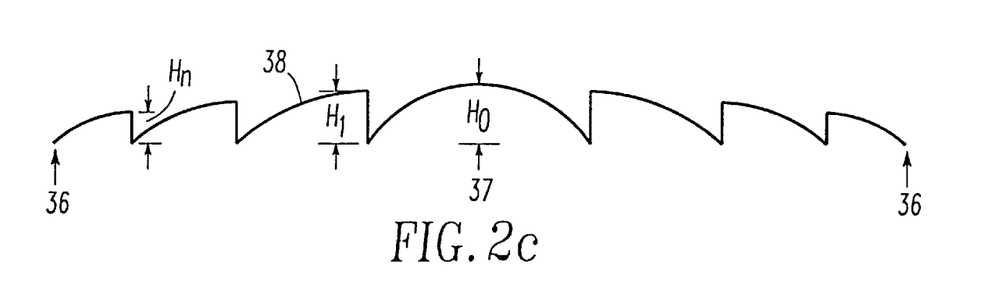

As shown in FIG. 2c, a height of a blaze 38 etched onto the optical element 20 may decrease from a height $H_O$ of a central blaze at a center 37 to a height $H_N$ at an Nth blaze at an edge 36 of the element 20. This decreasing height will diffract more of the input light away from the first order. Thus, the decrease in height will increase attenuation of power towards the edge of the element 20, due to diffraction.

Figure 2D:
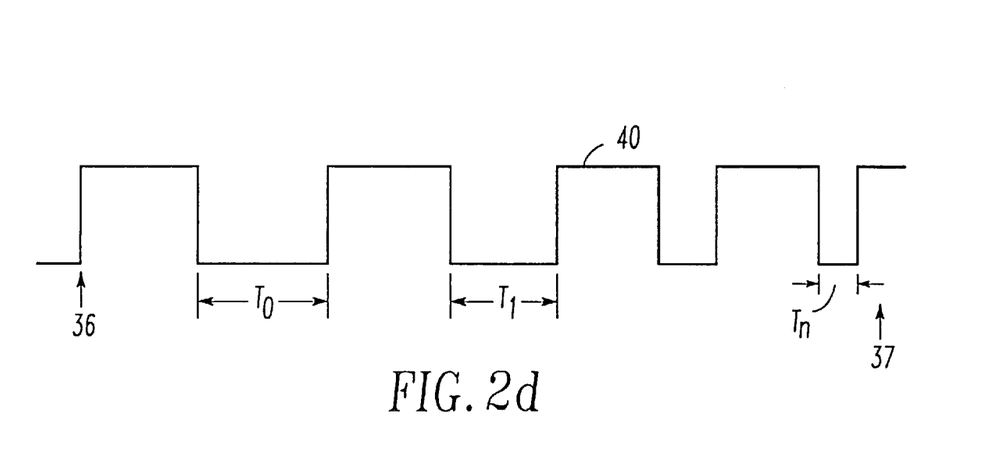

Alternatively, as shown in FIG. 2d, a duty cycle of a blaze 40 etched on the optical element 20 may decrease from a central duty cycle of $T_0$ at a center 37 to an Nth duty cycle of $T_N$ at an edge 36 of the element 20. The decrease in duty cycle will serve to increase attenuation of power towards the edge of the element 20, due to diffraction.

In all the configurations shown above, in the slow axis direction, almost no power hits the further out regions so there is little or no attenuation in the slow axis direction. In contrast, in the fast axis direction, a lot of power will hit the outer regions of the element. The reduction of power experienced by hitting these outer regions will circularize the output.

Figure 3A:
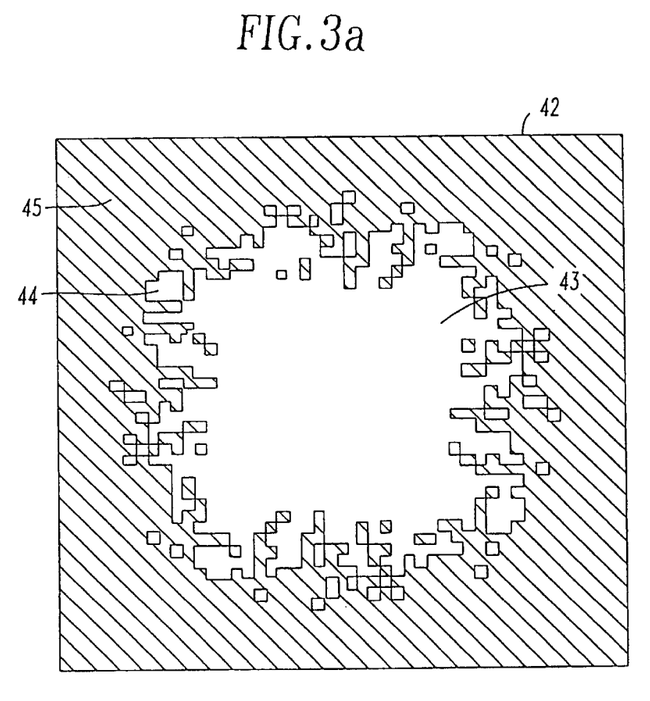
FIG. 3a illustrates a circularizing soft aperture diffractive optical element.

Referring now to FIG. 3a, a preferred embodiment of the soft aperture element is shown in the form of a diffractive phase grating constructed according to the teachings of the present invention. The transparent component 42 in FIG. 3a corresponds to the optical element 20. The shading lines represent light deflecting phase gratings that occlude by scattering the light from the wide portions of the laser output beam. The transparent component 42 has an aperture area in its central region 43 which is grating free. It also has an occlusion area in its outer region 45 where substantially all of the light is scattered. Between these two regions 43 and 45 is a transition region 44 where light is only partially occluded, as a grating surface is only partially present.

The transition region 44 has areas with scatter phase gratings and areas without gratings arranged in a random or pseudo-random fashion, while the density thereof increasing radially, so as to provide a soft aperture. The soft aperture reduces the formation of fringes or dark areas in the beam of light passing through the aperture.

An alternative to the above described phase grating is an amplitude modulator where the shaded area will all be opaque. The opaque areas are created using photo lithographic methods by depositing a material such as chrome or other substantially equivalent material and using a mask to etch the material into a substantially similar pattern to that shown in FIG. 3a but without the gratings. The irregular pattern of light transmission near the edge of the aperture effectively softens the edge of the aperture and adds light into the dark areas that would otherwise be formed by diffraction at the edge.

Figure 3B:
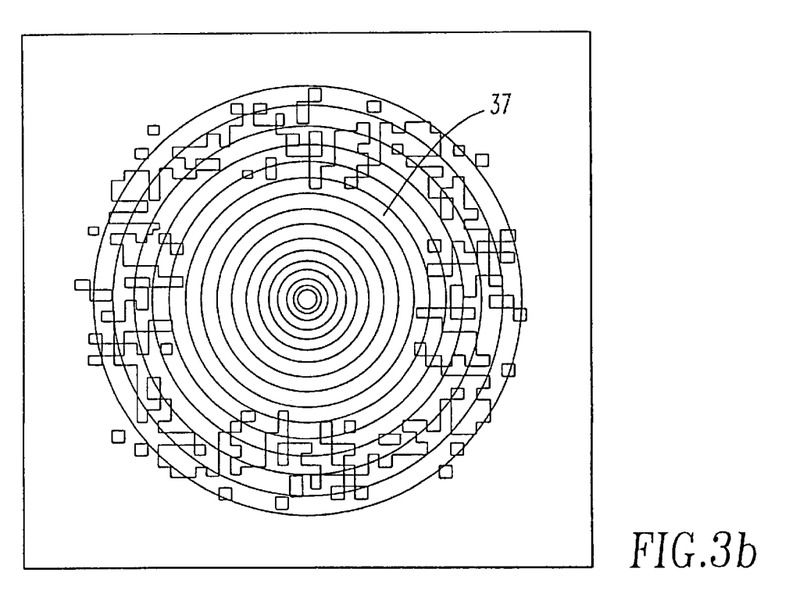
FIG. 3b illustrates a combined circularizing soft aperture and collimating diffractive optical element.

FIG. 3b shows a diffractive optical element 20 that combines the functions of circularizing and collimating into one element. The scatter phase grating or, alternately, the occluding amplitude modulating areas, are arranged in outer and transition regions as in FIG. 3a. The central area is not grating free, but instead has phase gratings 37 to collimate an incoming beam.

Figure 4A:
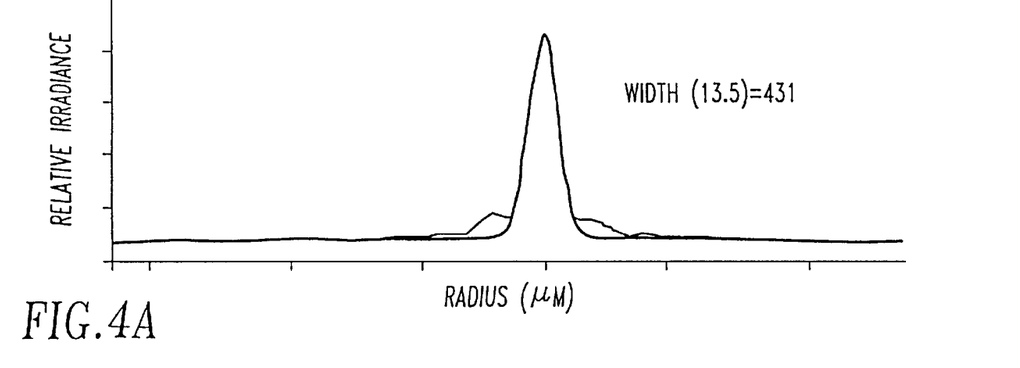
FIGS. 4a–4c illustrate the resultant output beam from an embodiment of the present invention.
Figure 4B:
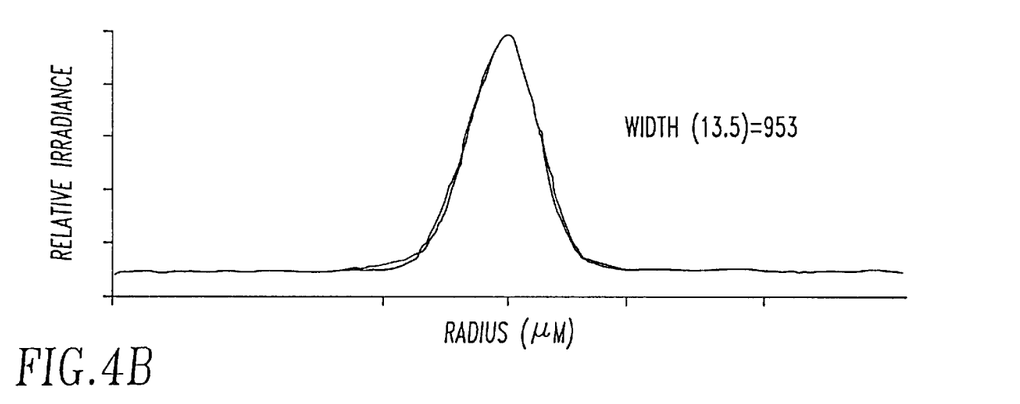
Figure 4C:
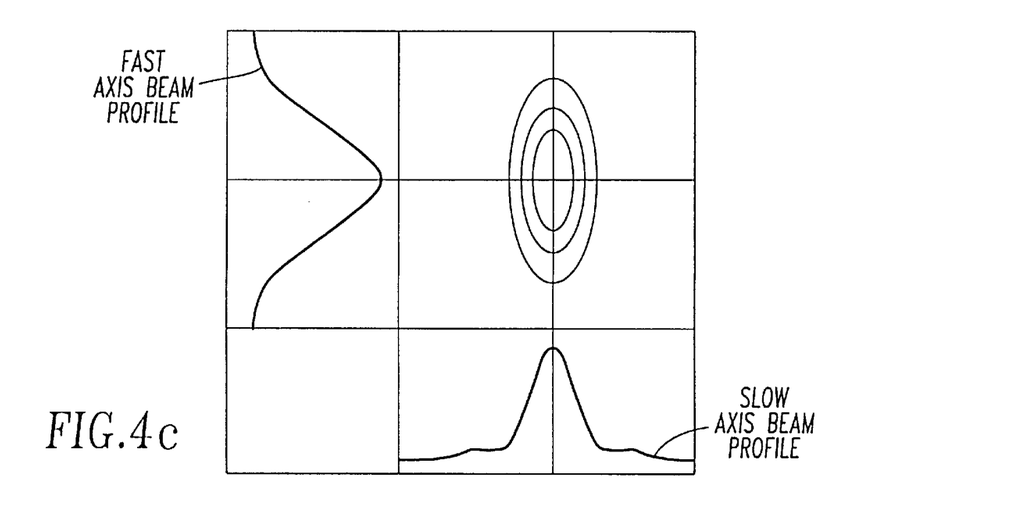

An example of improved circularity can be seen in FIGS. 4a–4c. The beam emanating originally from the laser has an ellipticity of 3:1. FIG. 4a illustrates a beam profile along the slow axis. The horizontal axis indicates relative irradiance, while the vertical axis indicates radius in microns. The beam width in FIG. 4a is 431 microns. FIG. 4b illustrates a beam profile along the fast axis. The vertical axis indicates relative irradiance, while the horizontal axis indicates radius in microns. The beam width in FIG. 4b is 953 microns.

Thus, the beam emerging from the optical element has ellipticity of roughly 2:1. The overall beam cross section 50 is shown in FIG. 4c as the intersection of the respective beam profiles. While this beam is not perfectly circular, the use of the diffractive optical element 10 is much simpler, and hence cheaper, than a doublet or element pair alternatives. Whenever a doublet or pair is used, costly optical alignment becomes critical, such that expensive, repetitive continuous alignment, including monitoring and feedback, is required.

Figures 5A, 5B, 5C:
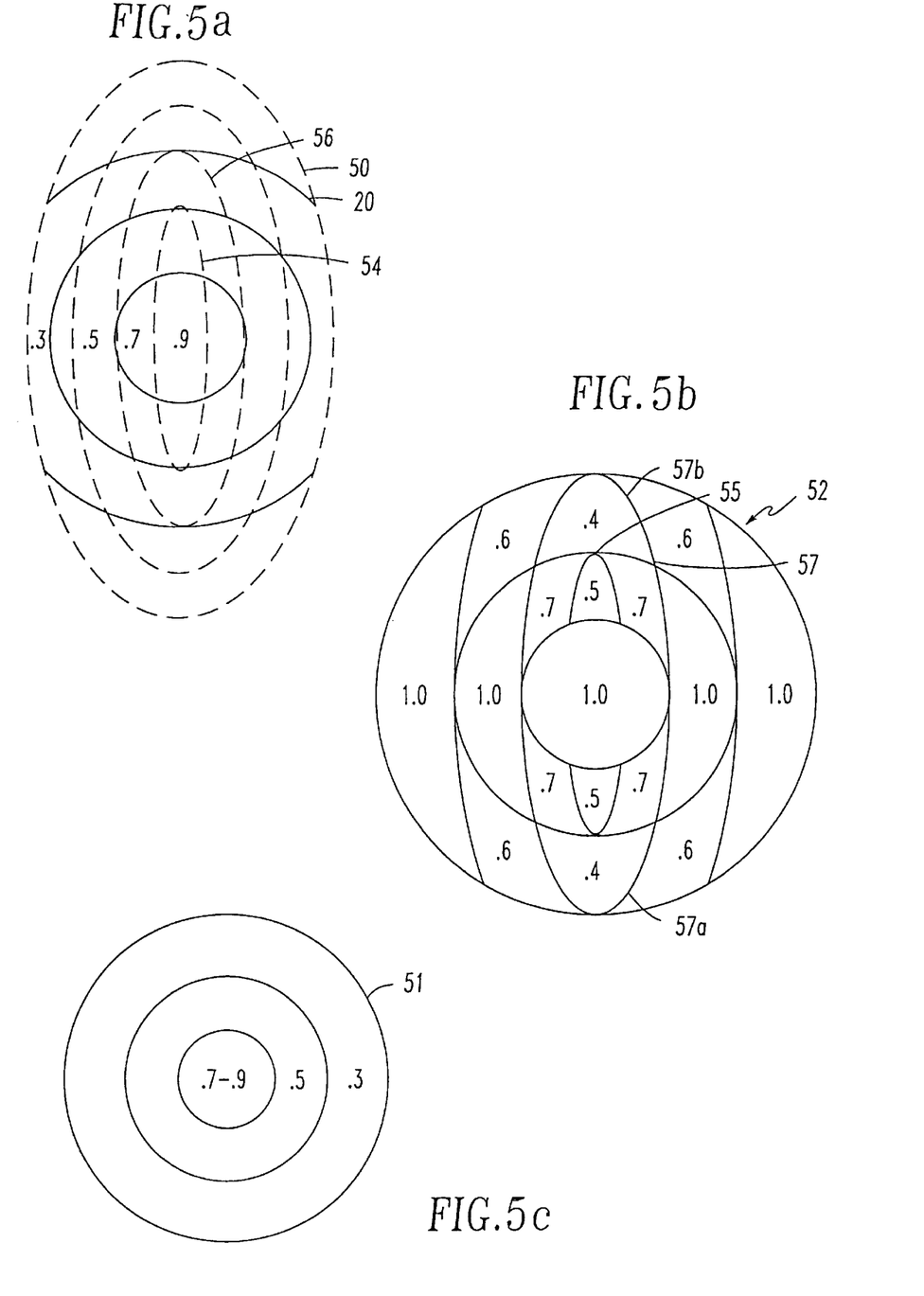

Even better circularity may be achieved using a single element by specifically designing the diffractive optic 20 to correct a specific beam profile 50, indicated by the dashed lines shown in FIG. 5a. An example of the beam profile 50 showing regions of constant power can be seen in FIG. 5a. The portions of the diffractive optic 20 having radially symmetric regions that would intersect the beam profile 50 are also shown in solid lines. A diffractive optic 52 which has been matched to the beam profile 50 is shown in FIG. 5b.

In the matched diffractive 52, the transmission of the various portions of the element are now broken in to regions, such that the diffractive is no longer radially symmetric. Therefore, alignment will be more difficult than for a radially symmetric diffractive. However, only alignment of one element is still required.

The portions of the matched diffractive 52 are designed to have a transmission value such that when the transmission is multiplied by the laser beam power in the beam profile 50, the power of the output beam 51, shown in FIG. 5c, will be distributed circularly. For example, a first inner ellipse 54 of the beam profile 50 has a constant power of 0.9. This first inner ellipse 54 will intersect the central region, having a transmission of one. The first inner ellipse 54 is also matched to a partial ellipse 55 having a transmission of 0.5 in the matched diffractive 52. Thus, the output power in this region will be 0.5.

A second ellipse 56 of the beam profile 50 has a constant power of 0.7. The second ellipse 56 will intersect the central region of the matched diffractive 52, thus the central portion of the output beam 51 will have a power of 0.7–0.9. The second ellipse 56 is also matched to a partial ellipse 57. An inner portion 57a of the partial ellipse has a transmission of 0.7, while an outer portion 57b has a transmission of 0.5. Therefore, the intermediate circle of the beam 51 has a power of 0.5 and the outer circle of the beam 51 has a power of 0.3. The rest of the matched diffractive 52 is similarly designed such that the circular beam 51 is obtained.

In those applications requiring correction of astigmatism, the design of the diffractive optic discussed above, which was radially symmetric, may be pulled out at the edges in order to correct for the astigmatism. The fringes themselves may be made elliptical. Further, the soft aperture does not have to be radially symmetric.

In many scenarios, it is desirable to provide other optical functions in addition to simply correcting the non-circularity and/or eliminating ringing as provided by the diffractive optic soft aperture discussed above. For example, the particular scenario discussed above regarding the use of a semiconductor laser, the laser beam is to be collimated as well as rendered more circular.

The soft aperture of the present invention may easily be integrated with another diffractive element which performs other desired optical functions. The soft aperture of the present invention can be used in conjunction with other elements to inexpensively help correct for any remaining non-circularity of the beam.

Such integration of the soft aperture is particularly useful when an diffractive element is already part of the system, since phase levels for performing multiple functions may be combined into one diffractive optical element. The phase grating levels of such a combination are created in accordance with the methods disclosed in U.S. Pat. No. 5,161,059 to Swanson et al. and U.S. Pat. No. 5,202,775 to Feldman et al., both of which are hereby incorporated by reference. The methods disclosed in these patents are used to convert appropriate phase functions into discrete phase levels.

Figure 6A:
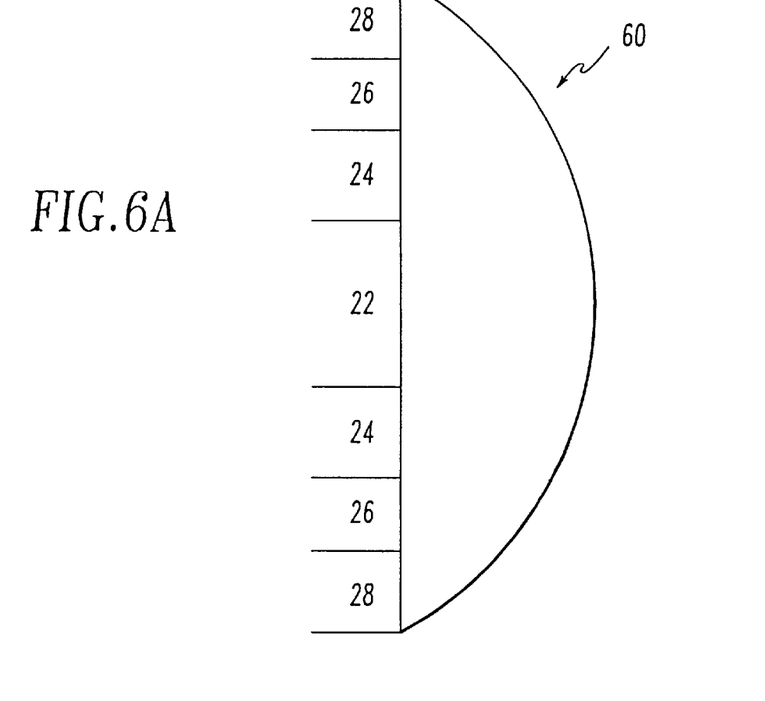
FIG. 6a illustrates a schematic side view of a hybrid diffractive soft aperture and refractive.
Figure 6B:
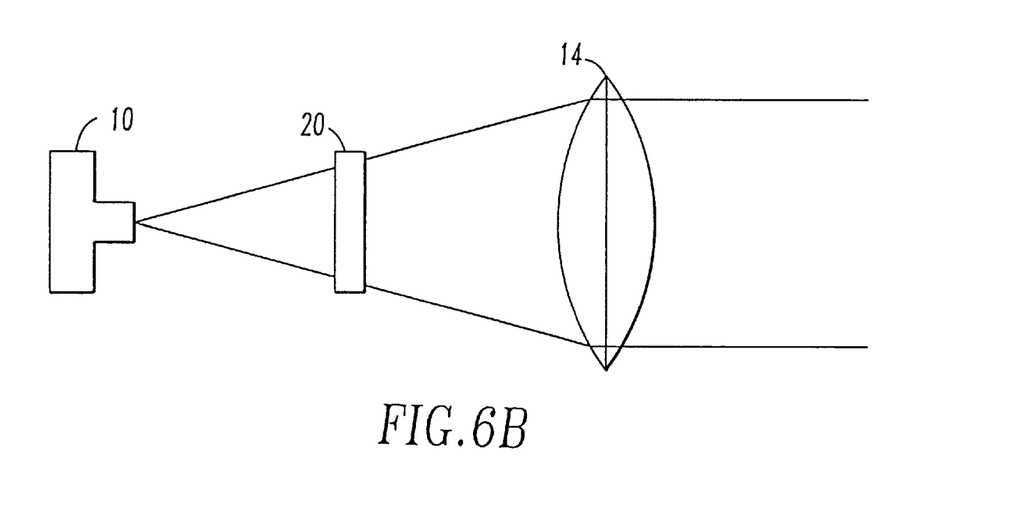
FIG. 6b illustrates a schematic side view of a diffractive soft aperture used in conjunction with a refractive element.

The soft aperture of the present invention may also be integrated with a refractive element which performs the other desired optical functions. A side view of such a hybrid 60 is shown in FIG. 6a. The various regions 22–28 of the diffractive are indicated. Each region 22–28 has a different degree of power attenuation. Alternatively, as shown in FIG. 6b, a diffractive element 20, in which the diffractive element is only a soft aperture, may be used in conjunction with a refractive element 14, but separately therefrom.

Figure 7A:
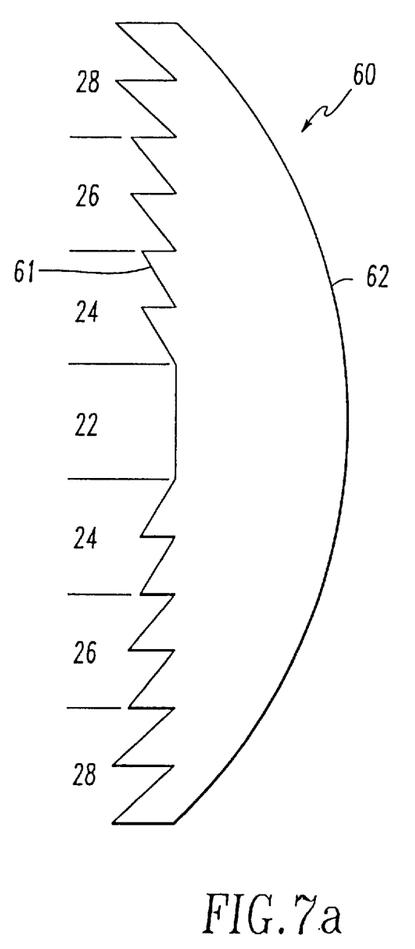
FIG. 7a illustrates a refractive/diffractive hybrid in which the diffractive serves only as a soft aperture.
Figure 7B:
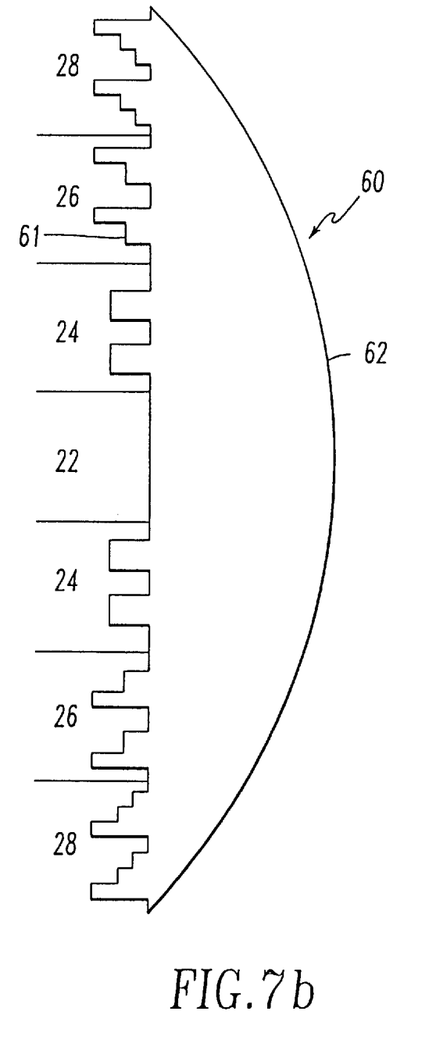
FIG. 7b illustrates another refractive/diffractive hybrid in which the diffractive serves only as a soft aperture.

In FIGS. 7a and 7b are two embodiments of a hybrid element 60 in which a diffractive portion 61 is used only as a soft aperture, and not for collimation. The collimation is performed by a refractive portion 62. Since the diffractive portion 61 can cause the focal length to change with wavelength, by using the diffractive only to attenuate, i.e., providing no optical power in the diffractive portion, this problem can be avoided.

In FIG. 7a, the blaze height of the diffractive portion 61 is less than $2\pi$ phase radians in the center and increases to $2\pi$ phase radians at the edge. In the configuration shown in FIG. 7a, the desired beam output is the zeroth order beam. The center of the diffractive portion 61 contains no blaze, thus the zero order beam will pass therethrough unaffected.

In FIG. 7b, the diffractive portion 61 includes binary portions of increasing phase levels which diffract more and more light into higher orders. In the configuration shown in FIG. 7b, the desired beam output is the zeroth order beam. The center of the diffractive portion 61 contains no phase levels, thus the zero order beam will pass therethrough unaffected. Therefore, an increase in the number of phase levels results in an increase, rather than decrease, in the amount of attenuation, since the phase levels diffract the light into orders of one or higher.

Both of the configurations shown in FIGS. 7a and 7b serve as fast soft apertures, i.e., the amount of power diffracted into higher orders increases quickly as the light moves away from the center. In both of these configurations, the light in the zeroth order contributes to the desired signal. The light in the first and higher orders is diffracted away from the optical axis.

When used only as a soft aperture, there is no diffraction grating in the center. Thus, the refractive surface 62 encountered by all light passing through the central portion of the diffractive surface 61 will appear as only the normal refractive lens. As the light moves towards the edges, more and more power is diffracted away.

Of course, the diffractive portion of a refractive-diffractive hybrid may be used to contribute to collimation the light as well as serve as the soft aperture. Examples of such a hybrid refractive-diffractive element 64 are shown in FIGS. 8a and 8b.

In FIGS. 8a and 8b, a hybrid element 64 includes a refractive portion 62 integrated with a diffractive element 66, 68. In the particular diffractive 66 shown in FIG. 8a, the blaze height of the diffractive surface decreases in a radially outward direction. The particular diffractive shown in FIG. 8b is a binary approximation of the surface shown in FIG. 8a, but reduces the number of phase levels in a radially outward direction, instead of decreasing the blaze height.

By placing the diffractive portions 66, 68 on the back of the refractive element 62, the hybrid element 64 is an athermal element when the diffractive portion also contributes to collimation. In other words, the focal length of the hybrid element 64 does not change with temperature if the correct amount of optical power is distributed between the diffractive and refractive portions. As noted above, plastic refractive will typically have an index of refraction which changes with temperature. The use of plastic is known to be desirable for many applications, due to features such as reduced weight, ease of machining, etc.

The integration and joint functioning provided by the hybrid element 60, 64 eliminates the need for complicated active alignment required when using two individual elements. When the hybrid element is radially symmetric, only alignment along the X- and Y-axes are required. When not radially symmetric, alignment in theta is also required, but since it is still a single element, active alignment is not needed.

Even when the diffractive element is separate from the refractive element, as shown in FIG. 6b, since the diffractive element does not contribute to collimation, i.e., serves only as a soft aperture and presents no optical power, active alignment is not required.

The making of a plastic hybrid element is disclosed, for example, in commonly assigned copending application Ser. No. 08/677,521 filed on Jul. 10, 1996, which is hereby incorporated by reference. The diffractive element 66 may include diffractives in addition to the soft aperture of the present invention. The inclusion of the soft aperture in a hybrid already having a diffractive portion involves little or no extra cost, since the inclusion thereof involves changing the diffractive structure.

As described above, the present invention may be used to provide a diffractive soft aperture, which may or may not also collimate, either alone or in combination with other elements. Disclosed are several manners in which to change the attenuation presented by the various regions of the soft aperture, including varying the duty cycle, the number of phase levels and/or the depth. Other such attenuators, such as gratings or patches for scattering light, may also be used.

As will be apparent to those skilled in the art, the diffractives designed in accordance with the present invention may also be deep diffractives. Deep diffractives are diffractives in which the phase depth is greater than $2\pi$.

Further, as will be apparent to those skilled in the art, the diffractive optics of the present invention may be made by any known conventional methods, such as photolithography, diamond tuning, etc. The selection of the appropriate method will depend on the substrate material, the particulars of the design in accordance with the present invention, the intended application, degree of precision required, cost and time allocation, etc.

The invention being thus described, it would be obvious that the same may be varied in many ways. Such variations are not regarded as a departure from the spirit and scope of the invention, and such modifications as would be obvious to one skilled in the art are intended to be included within the scope of the following claims.

What is claimed is:

1. An optical element comprising a soft aperture providing varying degrees of power attenuation to an input beam having a slow axis and a fast axis, with a first power attenuation being at an edge of the element and a second power attenuation being at the center of the element, the second power attenuation being less than the first power attenuation, wherein at least a full width at half maximum portion of the beam along the slow axis encounters the second power attenuation, none of the beam along the slow axis encounters the first power attenuation and a portion of the beam along the fast axis encounters the first power attenuation, said soft aperture comprising diffractive portions randomly dispersed in different radial regions of the element, a density of said diffractive portions increasing as radial regions in which said diffractive portions are located are further removed from a center of the element, thereby providing said varying degrees of power attenuation.

2. The optical element as recited in claim 1, further comprising a plastic substrate on which said soft aperture is formed.

3. A method for circularizing a light beam having a slow axis and a fast axis comprising:
providing a first power attenuation to the light beam at an outer edge of a diffractive optical element, including providing metal patches of a first density on said outer edge;
providing a second power attenuation to the light beam at a center of the diffractive optical element including providing metal patches of a second density on said center, said second density being lower than said first density, the second power attenuation being less than the first power attenuation; and
passing the light beam through the diffractive optical element such that at least a full width at half maximum portion of the beam along the slow axis encounters the second power attenuation, none of the beam along the slow axis encounters the first power attenuation and a portion of the beam along the fast axis encounters the first attenuation.

4. The method as recited in claim 3, further comprising integrating said diffractive optical element with at least one of diffractive optics and refractive optics providing additional functioning to create an integrated optical element.

5. A method for circularizing a light beam having a slow axis and a fast axis comprising:
providing a first power attenuation to the light beam at an outer edge of a diffractive optical element, including providing diffractive scattering portions of a first density on said outer edge;
providing a second power attenuation to the light beam at a center of the diffractive optical element including providing diffractive scattering portions of a second density on said center, said second density being lower than said first density, the second power attenuation being less than the first power attenuation; and
passing the light beam though the diffractive optical element such that at least a full width at half maximum portion of the beam along the slow axis encounters the second power attenuation, none of the beam along the slow axis encounters the first power attenuation and a portion of the beam along the fast axis encounters the first attenuation.

6. An apparatus for reducing ellipticity of an elliptical light beam having an input beam profile made up of elliptical regions of particular power, the apparatus comprising a diffractive optical element having corresponding regions of transmission efficiency, the corresponding regions having varying degrees of power attenuation, metal patches being randomly dispersed in different radial regions of the diffractive optical element, a density of said metal patches increasing as radial regions in which said metal patches are located are further removed from a center of the diffractive optical element, thereby providing said varying degrees of power attenuation, wherein a product of a transmission efficiency of each region of the diffractive optical element and a particular power of corresponding regions of the input beam profile form an output beam profile, the output beam profile being more circular than the input beam profile.

7. The apparatus as recited in claim 6, further comprising a plastic substrate on which said diffractive optical element is formed.

8. An apparatus for reducing ellipticity of an elliptical light beam having an input beam profile made up of elliptical regions of particular power, the apparatus comprising a diffractive optical element having corresponding regions of transmission efficiency, the corresponding regions having varying degrees of power attenuation, diffractive portions being randomly dispersed in different radial regions of the diffractive optical element, a density of said diffractive portions increasing as radial regions in which said diffractive portions are located are further removed from a center of the diffractive optical element, thereby providing said varying degrees of power attenuation, wherein a product of a transmission efficiency of each region of the diffractive optical element and a particular power of corresponding regions of the input beam profile form an output beam profile, the output beam profile being more circular than the input beam profile.

* * * * *